Patented Nov. 4, 1952

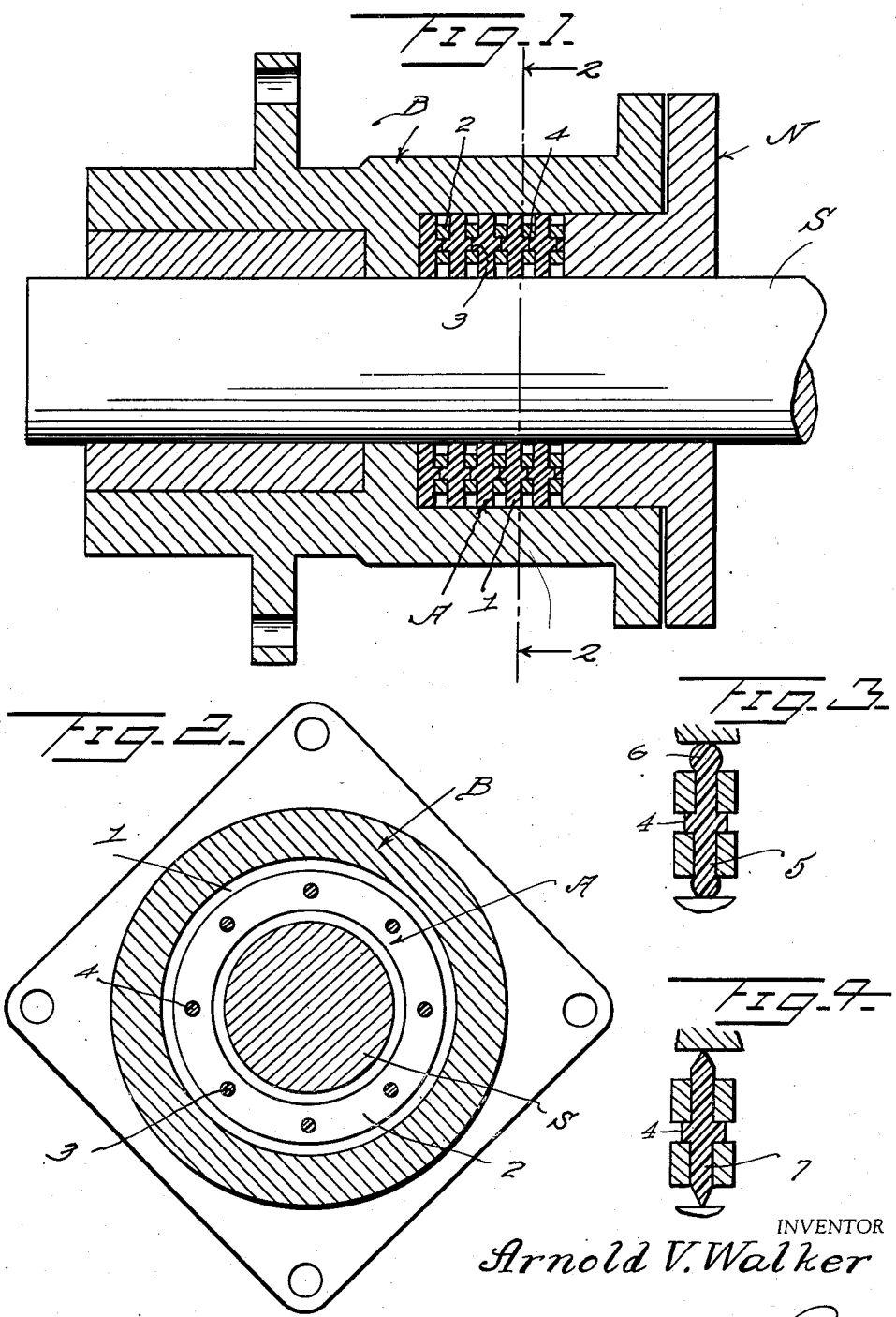

2,616,735

UNITED STATES PATENT OFFICE 2,616,735

ROD OR SHAFT PACKING

Arnold V. Walker, Pascagoula, Miss.

Application December 13, 1949, Serial No. 132,724

1 Claim. (Cl. 288—2)

This invention relates to a seal for liquids and it is primarily an object of the invention to provide a seal to prevent seepage of oil, water or other liquids beyond the applied seal.

It is also an object of the invention to provide a seal of this kind for use in a stuffing box for a shaft, stern and rudder tubes on boats.

A particular object of the invention is to provide a seat embodying rings of compressible material, such as neoprene, with metallic rings interposed between adjacent neoprene rings and wherein the seal, in addition to being adaptable to new units, may also be used in existing stuffing boxes for boat shafts or any other moving shaft in automotive vehicles etc.

The invention consists in the details of construction and in the combination and arrangement of the several parts of my improved seal for liquids, whereby certain advantages are attained, as will be hereinafter more fully set forth.

In order that my invention may be better understood, I will now proceed to describe the same with reference to the accompanying drawings, wherein:

Figure 1 is a view partly in section and partly in elevation of a seal constructed in accordance with an embodiment of the invention and applied;

Figure 2 is a sectional view taken substantially on the line 2—2 of Figure 1;

Figure 3 is a fragmentary view in section illustrating a modified form of seal; and Figure 4 is a fragmentary view in section illustrating another embodiment.

As illustrated in the accompanying drawings B denotes a stuffing box of a preferred type for a shaft S.

The seal A as a unit is annular and comprises the rings 1 of neoprene or other suitable compressible material with the metallic rings 2 interposed between adjacent rings 1 with one ring 2 overlying the outer face of an end ring 1. The rings 1 and 2 are flat or washer-like and each of the rings 2 is provided therearound with the equi-distantly spaced anchor holes 3 arranged substantially midway between the outer and inner peripheries of the ring 1.

The rings 1 and 2 of the unit A are tied in by the pins 4 integral with the rings 1 and which are tightly inserted in the anchor holes 3.

The rings 1 are substantially in duplicate as are the rings 2. Each of the rings 1 is of a thickness to provide the relatively broad outer and inner edge faces to assure effective contact with inner wall of the boxing B and with the periphery of the shaft S. The ring initially is of a major diameter in excess of the diameter of the box, said excess preferably being four ten-thousandths per inch of the diameter of the box. The central opening of the member 1 is also initially of a diameter less than the diameter of the shaft S preferably four ten-thousandths per inch of the diameter of the shaft.

Each of the rings 2 has its flat band of a width preferably two-thirds of the corresponding dimension of the band of a ring 1 and the rings 1 and 2 are preferably of the same thickness.

The unit A may be fabricated from sheets of neoprene and metal but is preferably cast. By casting, the neoprene will adhere to the metal rings much better than the fabricated type.

When cast, the pins 4 are integral with the adjacent rings 1. When fabricated the pins 4 are integral with each ring and of a length substantially one-half of the length of an anchor hole 3.

The purpose of the seal as herein embodied is to have a snug fit between the shaft S and the wall of the box B or the like. After initial application of the seal A, the same is compressed, as by the gland nut N thereby squeezing the neoprene rings 1 into a still closer fit. The percentage of compression may be increased or decreased at the job by use of additional rings 1.

In the embodiment of the invention as shown in Figure 3 of the drawings, the outer marginal portion of the neoprene or compressible member or ring 5 is formed to provide a surrounding head 6 substantially circular in cross section and of a major diameter greater than the thickness of the member or ring 5.

In the form of the invention comprised in Figure 4, the peripheral marginal portion of the compressible or neoprene member or ring 7 is oppositely beveled, as at 8.

From the foregoing description it is thought to be obvious that a seal for liquids constructed in accordance with my invention is particularly well adapted for use by reason of the convenience and facility with which it may be assembled and operated.

I claim:

In a rod or shaft packing, a plurality of annular elements of a compressible material, a like number of annular metal elements of a lesser diameter than that of the first elements each having a circular series of holes concentrically disposed with respect to the perimeter thereof, said metal elements, except one, being interposed between and in contact with the first elements, said one metal element being disposed against the outer of the first elements at the outer end of the assembly, and pins integral with and extending from opposite sides of certain of the first elements and fitting in the said holes of adjacent metal elements, the compressible element at the inner end of the assembly having integral pins on its inner side only fitting in the holes of the immediately adjacent metal element, said pins being of approximately one-half of the length of the said holes in which they are fitted.

ARNOLD V. WALKER.

REFERENCES CITED

The following references are of record in the file of this patent:

UNITED STATES PATENTS

| Number | Name | Date |
|---|---|---|
| 869,374 | Law | Oct. 29, 1907 |
| 1,005,954 | Fritz | Oct. 17, 1911 |
| 1,018,333 | Meyer | Feb. 20, 1912 |
| 1,488,695 | Miller | Apr. 1, 1924 |
| 1,969,008 | Hubbard | Aug. 7, 1934 |
| 2,027,653 | Roye | Jan. 14, 1936 |
| 2,255,829 | Spang et al. | Sept. 16, 1941 |